United States Patent
Gofer et al.

(10) Patent No.: US 6,403,255 B1
(45) Date of Patent: Jun. 11, 2002

(54) POLYVINYL MERCAPTAN REDOX MATERIAL FOR CATHODES IN NON-AQUEOUS BATTERIES

(75) Inventors: Yosef Gofer, Hod Hasharon; Anatoly M. Belostotskii, Jerusalem; Doron Aurbach, Bnei Brak, all of (IL)

(73) Assignee: Bar Ilan University, Ramat Gan (IL)

( * ) Notice: Subject to any disclaimer, the term of this patent is extended or adjusted under 35 U.S.C. 154(b) by 0 days.

(21) Appl. No.: 09/459,478

(22) Filed: Dec. 13, 1999

(51) Int. Cl.$^7$ ................................................ H01M 4/60
(52) U.S. Cl. ...................................................... 429/213
(58) Field of Search ............................. 429/213, 218.1, 429/192–194, 104

(56) References Cited

U.S. PATENT DOCUMENTS

| | | | | |
|---|---|---|---|---|
| 4,664,991 A | * | 5/1987 | Perichaud | 429/194 |
| 4,833,048 A | * | 5/1989 | Dejohnge | 429/104 |
| 5,162,175 A | * | 11/1992 | Visco | 429/192 |
| 5,324,599 A | * | 6/1994 | Oyama | 429/192 |
| 6,057,056 A | * | 5/2000 | Kim | 429/213 |
| 6,090,504 A | * | 7/2000 | Sung | 429/213 |

FOREIGN PATENT DOCUMENTS

| | | | | |
|---|---|---|---|---|
| JP | 60254515 | * | 12/1985 | H01B/1/10 |
| WO | WO200143209 | * | 6/2001 | H01M/0/00 |

* cited by examiner

*Primary Examiner*—Gabrielle Brouillette
*Assistant Examiner*—Mark Ruthkosky
(74) *Attorney, Agent, or Firm*—Mark M. Friedman

(57) ABSTRACT

A cathode material featuring PVM for use in rechargeable electrochemical cells. It has been discovered that the polymer backbone of PVM, which consists solely of carbon atoms, is not subject to scission during repeated charge-discharge cycles, such that the cathode material remains substantially insoluble in standard liquid electrolytes. As a result, cells containing PVM as the cathode material and liquid electrolyte are genuinely electrochemically reversible. The use of PVM overcomes the problems associated with organosulfides of the background art, with which dissolution of anions in the liquid electrolyte during discharging results in migration from the cathode and contamination of the anode/electrolyte surface and ultimately leads to degradation of the electrolyte and/or deterioration of the anode-electrolyte interface.

20 Claims, 4 Drawing Sheets

POLYVINYL MERCAPTAN REDOX MATERIAL FOR CATHODES IN NON-AQUEOUS BATTERIES

FIELD AND BACKGROUND OF THE INVENTION

The present invention relates to metal-sulfur type cells for making secondary batteries and, particularly to the utilization of organic sulfur as a cathode material for high energy-density batteries.

The utilization of organic sulfur as a cathode material for high energy-density batteries has been of growing interest over the last ten years. While elemental sulfur displays poor electrochemical activity at ambient temperatures, certain organosulfur compounds exhibit pronounced electroactivity that can be harnessed by energy-storage devices.

These organosulfur materials typically contain multiple, thiol groups that can be oxidized readily to form an insoluble high polymer. The polymer backbone is comprised of relatively small organic sections bonded through disulfide bonds. During the reduction process, the disulfide bridges are cleaved to form thiolates and the polymers are scissioned to form anionic monomers. The thiolate ions are reoxidized to form the polymer upon recharging.

U.S. Pat. No. 4,664,991 describes a battery containing a one dimensional electron conducting polymer which forms a complex with at least one polysulfurated chain. This polysulfurated chain is preferably formed through non-covalent interactions, and contains an unknown and uncontrolled, non-stoichiometric amount of sulfur because of the manufacturing process.

U.S. Pat. No. 4,833,048 to Dejonghe et al. describes a battery which features a cathode made from an organic sulfur material. The sulfur-sulfur bonds are broken in the discharged state to form organometallic salts. The organic sulfur material includes a polymer which features sulfur in the backbone, such that the sulfur atoms form disulfide bonds. The patent discloses a cell with an excellent specific charge density. However, although the cathode material in the charged, oxidized form is an insoluble solid, upon discharging the polymer is scissioned to form soluble anionic monomers. The anions, upon formation diffuse from the electrode to the solution. As a result, the charging rate is limited by the rate of diffusion of the thiolate monomers from the bulk solution to the surface of the cathode. Moreover, since the cathode is utilized in the liquid state, solvents are needed to provide the requisite current transport.

One solution for overcoming the deficiencies inherent in cathode materials which are relatively soluble in the reduced, depolymerized state is the utilization of solid electrolytes, i.e., electrolytes that allow the transport of ions as charge carriers, even though the matrix remains solid.

U.S. Pat. No. 5,162,175 to Visco et al. attempts to overcome the deficiencies inherent in cathode materials that are relatively soluble in the reduced, depolymerized state by providing an electrolytic cell in which all the components are in the solid state. In the fully charged states the cathode comprises a one-dimensional, two-dimensional, or three-dimensional polymeric electroactive component. One two-dimensional polymer is disclosed with sulfur groups that are pendant from the backbone, but which is not PVM [poly(vinyl mercaptan)]. Indeed, this polymer has a backbone which also contains nitrogen atoms and which therefore could also be susceptible to scission. Furthermore, U.S. Pat. No. 5,162,175 does not teach or suggest the importance of a polymer backbone which contains only carbon atoms, or of the utility of PVM. It must also be noted that, while U.S. Pat. No. 5,162,175 claims to provide an all solid state battery operating in the temperature range of ambient to 145° C., it is known that the use of solid electrolytes is limited to warm or high temperature cells, at least about 82° C. and certainly no less than about 60° C., because known solid electrolytes, such as polyethylene based electrolytes and β-alumina based electrolytes, exhibit very low conductivity at ambient temperatures.

U.S. Pat. No. 5,324,599 describes electrode materials, one of which is a conductive polymer with a disulfide group. The conductive polymer is a π conjugated conductive polymer, which could include the sulfur group either in the backbone or else as a pendant group from the backbone. However, PVM is not a π electron conjugated conductive polymer. Moreover, PVM has insulating properties and cannot be considered a conductive polymer.

In "Novel Solid Redox Polymerization Electrodes" (JES 138 1896-1901, 1991) Liu et al. classify all the families of polymers based on organic moieties and disulfides. All possible arrangements and all possible polymers of the disulfide family are included. The authors also tested the electrochemical properties of one or more of each of the families and arrived at several important conclusions.

First, cross linked polymers that are cross linked by disulfide bonds suffer from very bad mobility of ions within the polymer film, thus exerting high iR drops.

Second, linear polymers and cross linked polymers that are cross linked by disulfide bonds are suspected of migrating to the anode in the reduced, monomeric state. The authors propose that the synthesis of large polymers may be an appropriate remedy for the problem of migration, which can lead to degradation of the electrolyte or to the deterioration of the anode-electrolyte interface.

Third, ladder polymers are also suspected of migrating to the anode in the reduced state, albeit to a lesser degree. PVM and polyethylene imine derivative are cited as examples of a ladder polymer.

Although PVM is mentioned as an example of a ladder polymer, PVM is not recommended or favored over other ladder polymers, nor are ladder polymers favored over other families of organosulfides. All families of organosulfide compounds are identified by the authors, such that no clear direction is provided.

There are other reasons that the use of PVM in a cathode material is far from obvious. Many characteristics are required for the technical success of an electrolytic cell in general and for a cathode material in particular. These characteristics include:

1. Cyclability/Electrochemical Reversibility

The cyclability of a particular electrolytic cell depends on many factors, the most important of which are the oxidation-reduction characteristics of the cathode in conjunction with the anode and the electrolyte; the tendency of the anions to migrate to the electrolyte or to approach the anode/electrolyte surface during discharging; and the possible degradation of the electrolyte and/or deterioration of the anode/electrolyte interface.

2. Oxidation Potential

The oxidation potential must be high enough to be of practical importance for batteries (>1.5V higher than the anode material), but not too high for the electrochemical window of the cell, which also depends on the behavior of the electrolyte.

3. Specific Charge Density

The specific charge density of a material is an indication of the compactness of energy storage, i.e., the amount of charge delivered by a given species divided by the molecular weight. The specific charge density generally ranges between 20 and 1000 milliamperes*hour/gram.

4. Kinetics of Charge-Transfer Reactions

The rate at which the charge is transferred is of particular importance. Often, the kinetics can be improved significantly by enlarging the contact (surface) areas and/or by utilizing additives with electrocatalytic properties.

5. Self-Discharge

A practical battery must have a reasonable shelf life, i.e., an ability to retain the stored charge over long periods of time when not in use. This depends not only on the particular properties of the cathode and anode materials, but on the interactions with the other components of the cell.

6. Operating Temperature/Temperature Range

Many batteries, particularly solid-state batteries, operate at high temperatures. Batteries using sodium beta alumina as the electrolyte, for example, operate at temperatures above 220° C. The vast majority of battery applications require performance in the range of ambient temperature, from about −20° C. to about 40° C.

7. Sensitivity to specific electrolytes, anode materials, etc.

The cathode material must be substantially inert with respect to the other components of the cell.

There are several additional factors that are unconnected with the electrochemical performance of the battery, but are of crucial importance in the viability of the battery in the marketplace. These include toxicity and cost (raw materials, processing, etc.).

Regarding ladder polymers, of which PVM is cited as an example, Liu et al. relate to the reduced tendency of the anions to migrate to the electrolyte (or to approach the anode/electrolyte surface) during discharging, relative to linear and cross-linked polymers; they do not, however, relate to other parameters influencing cyclability, nor do they relate to the host of other electrochemical properties cited above, including oxidation potential, self-discharge properties, operating temperature and temperature range, and sensitivity to specific electrolytes and anode materials.

Moreover, regarding anion migration, the authors speculate that some dissolution and migration will occur with ladder polymers, even ladder polymers containing only carbon atoms in the backbone (such as PVM).

Liu et al. also relates to the kinetics of charge-transfer reactions. Linear polymers are clearly favored relative to cross-linked polymers and ladder polymers because of their fast ionic transport.

In the conclusion of the paper, the authors neglect the family of ladder polymers and emphasize the virtues of polydisulfides. The authors conclude that polydisulfides are remarkably attractive, as they are easy to fabricate, of low-toxicity, cheap and biodegradable. It is also claimed that polydisulfides possess excellent cyclability and electrochemical reversibility.

Moreover, of the organosulfides specifically-mentioned as examples, none display the characteristics necessary for a practical recyclable battery, even those materials that were tested and favored. All cells utilizing the favored organosulfides operate at temperatures exceeding 80° C. Since all known solid electrolytes (e.g. polyethylene oxide based and beta-alumina based electrolytes) display very low conductivities at room temperature ($\sim 10^{-6}$ S), the utilization of solid electrolytes limits such cells to high-temperature operation well above ambient temperatures, and to low operating power. Liu et al. do not mention that in order to have high cyclability one has to resort to high temperature membranes. This point has also been emphasized by other researchers [Oyama and Naoi, EA 37 1851-1854-1901 (1992)].

In addition to the above, it should be appreciated that PVM was not mentioned in any of the authors' patents, nor was PVM the subject of any subsequent paper or experimental work of the authors. The use of PVM as a cathode material has not been the subject of any paper or experimental work by scientists around the world in the eight years which have elapsed since the paper was published, not in conjunction with a solid electrolyte and not in conjunction with a liquid electrolyte. This, despite the vast interest in organosulfides on one hand [see Fujita and Tsutsui, Electrochimica Acta 40 879–882 (1995), Genies and Picart, J. of Electroanal. Chem 408 53–60 (1996)] and the noted lack of a practical ambient-temperature battery utilizing an organosulfide-based cathode material on the other hand.

There is therefore a need, and it would be highly advantageous to have, an organosulfide-based cathode material with superior electrochemical properties, a material that remains substantially solid during discharging and promotes excellent reversibility, even at ambient temperatures, and has a high specific charge density. It would be of further advantage to have an organosulfide-based cathode material with a suitable oxidation potential relative to commonly-used anodes and electrolytes, and displays substantially inert behavior with respect to such commonly-used components. Finally, it would be of advantage to have an organosulfide-based cathode material that exhibits low toxicity and is inexpensive to produce and process.

SUMMARY OF THE INVENTION

The present invention is the utilization of PVM as a cathode material for use in rechargeable electrochemical cells. It has been discovered that the polymer backbone of PVM, which consists solely of carbon atoms, is not subject to scission during repeated charge-discharge cycles, such that the cathode material remains substantially insoluble in standard liquid electrolytes. As a result, cells containing PVM as the cathode material and liquid electrolyte are genuinely electrochemically reversible.

The use of PVM overcomes the problems associated with organosulfides of the background art, with which dissolution of anions in the liquid electrolyte during discharging results in migration from the cathode and contamination of the anode/electrolyte surface and ultimately leads to degradation of the electrolyte and/or deterioration of the anode-electrolyte interface.

It has been further discovered that PVM exhibits an excellent oxidation potential of 3.5 V–4.5 V vs. classic anodes such as sodium and lithium, respectively. This oxidation potential places the polymer in an appropriate electrochemical window for utilizing a wide variety of anode materials, such as magnesium, carbon, lithium, sodium, etc. PVM has also been found to be appropriate for a wide range of electrolytes, including commonly-used electrolytes such as acetonitrile, propylene carbonate, ethylene carbonate, and sulfolane, as well as a number of commercially-important anodes including anodes made from lithium, sodium, magnesium, and magnesium salts.

PVM is simple and inexpensive to produce in industrial quantities. Moreover, it has been found that, in contrast to many other organosulfides, the characteristic flexibility of PVM allows the cathode material to be formulated without an organic binder, such as PVdF or Teflon, thereby reducing losses in energy density, simplifying formulation, and reducing production costs. The molecular structure of PVM, which is a modification of the well-known and well-characterized PVC, also suggests a very low toxicity relative to the family of organosulfides.

According to the teachings of the present invention there is provided a cathode material for use in an electrochemical cell, said cathode material comprising PVM.

In a preferred embodiment, the cathode material comprises PVM and a conducting additive.

In a preferred embodiment, the PVM containing cathode material is free of binder.

In yet another preferred embodiment, the conducting additive is selected from the group consisting of carbon black, graphite powder, acetylene black and high surface area carbon.

According to further features in preferred embodiments of the invention described below, the cathode material according to the present invention is incorporated into specific electrochemical cells comprised of PVM and an appropriate anode and electrolyte.

According to further features in the preferred embodiments, the appropriate anode material is selected from the group consisting of lithium, sodium, magnesium, magnesium salts, aluminum, lithiated carbon, and lithiated tin oxide.

According to further features in the preferred embodiments, the appropriate electrolyte comprises a solvent selected from the group consisting of acetonitrile, alkyl carbonates, including propylene carbonate and ethylene carbonate, esters, such as methyl formate, and other organic solvents, such as sulfolane, glyme, diglyme, NMP, and combinations thereof.

According to further features in the preferred embodiments, the electrolyte comprises a cation selected from the group consisting of lithium, sodium, potassium, magnesium, aluminum, tetraalkylammonium, and combinations thereof.

According to further features in the preferred embodiments, the electrolyte comprises an anion selected from the group consisting of $PF_6$, $AsF_6$, $ClO_4$, $BF_4$, F, and combinations thereof.

More specifically, PVM was found to perform well in the presence of a salt selected from the group tetraalkyl ammonium tetrafluoroborate, $LiPF_6$, $LiBF_4$, $Mg(ClO_4)_2$ and combinations thereof.

In yet another preferred embodiment, PVM is incorporated into an electrochemical cell that is substantially rechargeable at ambient temperatures.

The present invention successfully addresses the shortcomings of the presently-known electrolytes and provides the basis for the production of a viable, rechargeable magnesium battery with a nominal voltage exceeding 2.5 volts and a viable, rechargeable lithium battery with high energy density.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
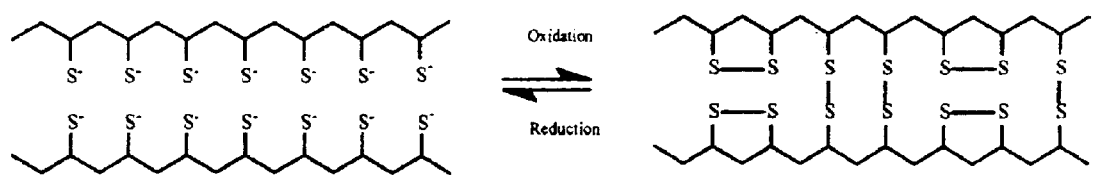
FIG. 1 is a schematic drawing of the molecule of PVM, both in the charged, oxidized state and in the reduced, discharged state.

The present invention is the utilization of PVM as a cathode material for use in rechargeable electrochemical cells. It has been discovered that the polymer backbone of PVM, which consists solely of carbon atoms, is not subject to scission during repeated charge-discharge cycles, such that the cathode material remains substantially insoluble in standard liquid electrolytes. As a result, cells containing PVM as the cathode material and liquid electrolyte are genuinely electrochemically reversible.

PVM exhibits an excellent oxidation potential of 3.5 V–4.5 V vs. classic anodes such as sodium and lithium, respectively, and performs well in conjunction with other important anode materials, including anodes made from magnesium and lithiated carbon. PVM has also been found to be appropriate for a wide range of electrolytes, including commonly-used electrolytes such as acetonitrile, alkyl carbonates, such as propylene carbonate and ethylene carbonate, esters, such as methyl formate, and other organic solvents, such as sulfolane. PVM performs well in the presence of a variety of salts, such as tetraalkyl ammonium tetrafluoroborate, lithium salts, including $LiPF_6$ and $LiBF_4$ and magnesium salts, such as $Mg(ClO_4)_2$.

According to the teachings of the present invention there is provided a cathode material for use in an electrochemical cell, said cathode material comprising PVM.

In a preferred embodiment, the cathode material comprises PVM and a conducting additive.

In a preferred embodiment, the PVM containing cathode material is free of binder. It has been found that, in contrast to many other organosulfides, the characteristic flexibility of PVM allows the cathode material to be formulated without an organic binder, such as PVdF and Teflon. This reduces the material and processing costs associated with the manufacturing of a cathode material, and improves the practical specific charge density. Pure PVM has a high specific charge density to begin with (454 mAh/g), such that eliminating the need for an organic binder provides PVM with a high practical specific charge density.

PVM is simple and inexpensive to produce in industrial quantities. Moreover, the molecular structure of PVM also suggests a very low toxicity relative to the family of organosulfides.

In another preferred embodiment, the conducting additive is selected from the group consisting of carbon black, graphite powder, acetylene black and high surface area carbon. Such additives greatly increase the surface area, thereby improving the electrokinetics.

According to further features in preferred embodiments of the invention, the cathode material according to the present invention is incorporated into specific electrochemical cells comprised of PVM and an appropriate anode and an electrolyte.

According to further features in the preferred embodiments, the appropriate anode material is selected from the group consisting of lithium, sodium, magnesium, magnesium salts, aluminum, lithiated carbon, and lithiated tin oxide.

According to further features in the preferred embodiments, the appropriate electrolyte comprises a solvent selected from the group consisting of acetonitrile, alkyl carbonate, such as propylene carbonate, ethylene carbonate, esters, such as methyl formate and other organic solvents, such as sulfolane, glyme, diglyme, NMP, and combinations thereof. PVM performs well in conjunction with electrolytes comprising salts including tetraalkyl ammonium tetrafluoroborate, $LiPF_6$, $LiBF_4$, and $Mg(ClO_4)_2$ Moreover, PVM is perform well in the presence of virtually any other inert salt.

In yet another preferred embodiment, PVM is incorporated into an electrochemical cell that is substantially rechargeable at ambient temperatures.

The principles and utilization of PVM as a cathode material and as a cathode material incorporated in electrochemical cells according to the present invention may be better understood with reference to the drawings and the accompanying description.

Referring now to the drawings, FIG. 1 shows the molecular scheme of PVM and illustrates the molecular transformations that PVM undergoes during charge-discharge cycles. As can be seen in the drawing, only the disulfide bonds present in the oxidized, charged state are cleaved, leaving the polymer backbone intact, with sulfur (thiolate) moieties pendant to the polymer backbone. Since the polymer does not undergo scission and degradation in each cycle to form readily-soluble monomer units, the solubility in the organic solution is extremely low, such that the material remains intact in the cathode current collector over multiple cycles.

Samples of PVM electrodes were prepared by mixing NMP solution of PVM with 8 to 10% carbon black and spreading onto platinum or nickel foil. After evaporation of the solvent, the electrodes were tested in half-cells with a variety of solutions.

Figure 2:
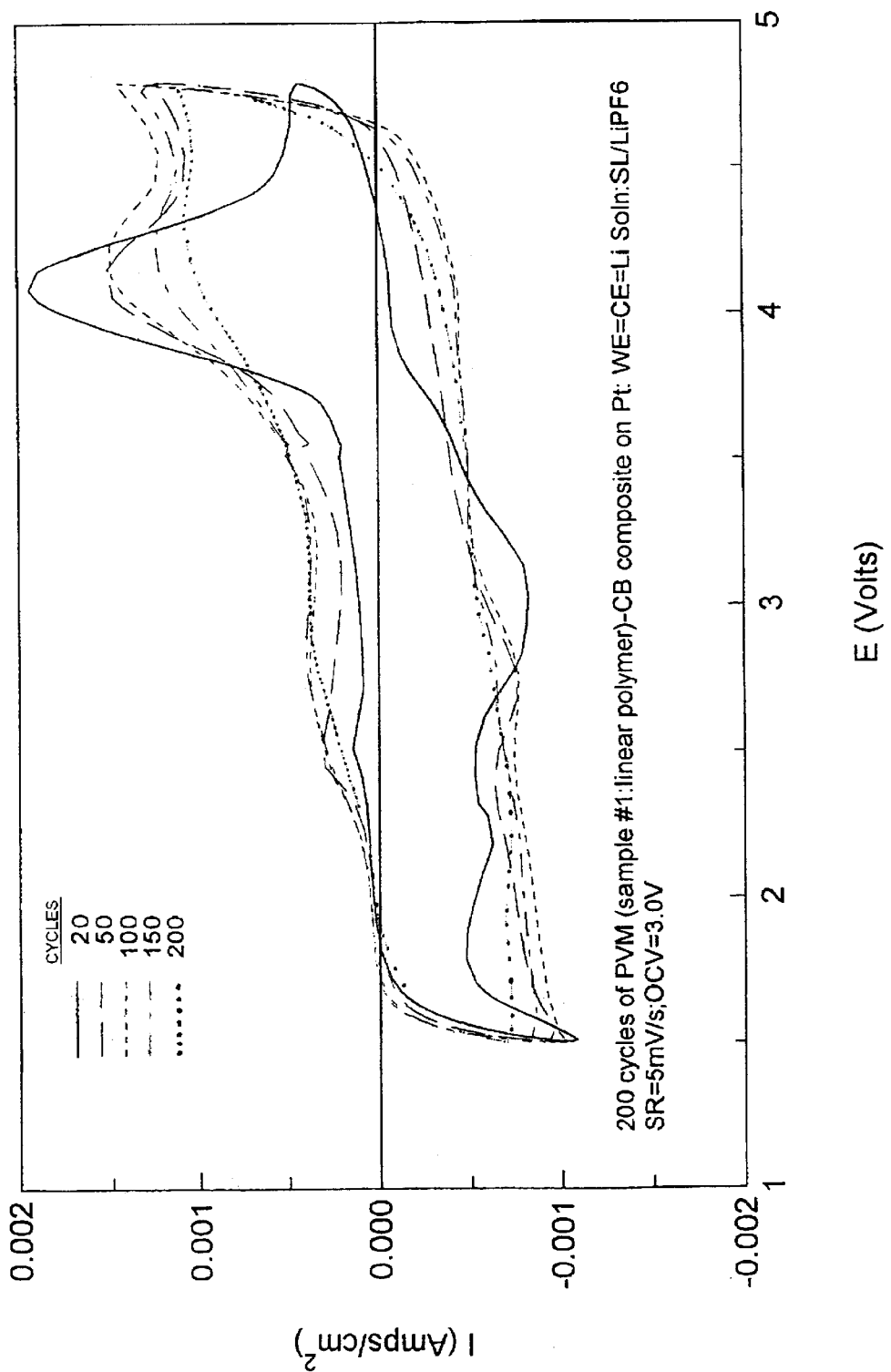
FIG. 2 provides a typical cyclic voltammetry, of PVM in sulfolane/lithium fluorophosphate, with over 200 cycles.

FIG. 2 provides a typical cyclic voltammetry of PVM in sulfolane/lithium fluorophosphate, with over 200 cycles. The 5 curves represent the $20^{th}$, $50^{th}$, $100^{th}$, $150^{th}$ and $200^{th}$ cycles of charging-discharging. Despite the change in shape of the curve, it is clearly evident from FIG. 2 that the charge associated with the reduction wave (i.e., the part in which the operating battery provides energy) remains constant.

From FIG. 2 it is apparent that PVM undergoes reduction in the potential range of 3.5 to 1.8 V and reoxidation in the potential range of 3.7 to 4.4 V. By integrating the curve of current vs. time, the specific charge capacity of the PVM can be calculated with respect to the mass of the active material. The cyclability, defined as the average loss of charge per cycle, is calculated by comparing the charge passed in the last scan to the charge passed in the first scan. It is observed from FIG. 2 that the cyclability of PVM in the aprotic liquid solution is extremely good over 200 charge-discharge cycles.

From the vast number of experiments conducted, it is concluded that PVM is substantially blind to the nature of the salt in the solution and to the nature of the anode material; the performance was very similar in all solutions tested. In general, specific charge capacities of about 50–60 mAh/g were measured, without the optimization of all the experimental parameters, such as scan rate, amount of carbon black, current densities, size, etc. While small variations in performance were observed using different solvents, these variations were not significant provided that the solvent and the salt provide an electrochemical stability window of at least 4.5 V vs. lithium.

Various polydisulfides have been publicized in the literature (e.g., Liu et al.) as possessing attractive properties as cathode materials, including DMcT (poly(2,5-dimercapto 1,3,4-dithiazole)), poly(trithiocyanuric acid), and 2-mercapto ethyl sulfide. As with PVM, the performance of these well-known, background art polymers were measured under ambient conditions in conjunction with ten commonly-used solvents and five commonly-used salts. Each combination of solvent, salt, and anode material was chosen in accordance with the electrochemical stability window of each background art polymer. Irrespective of these combinations, it was found that the charge capacity of these background art polymers decreased significantly from cycle to cycle, such that after 10–20 cycles, the charge capacity was substantially zero.

Figure 3A:
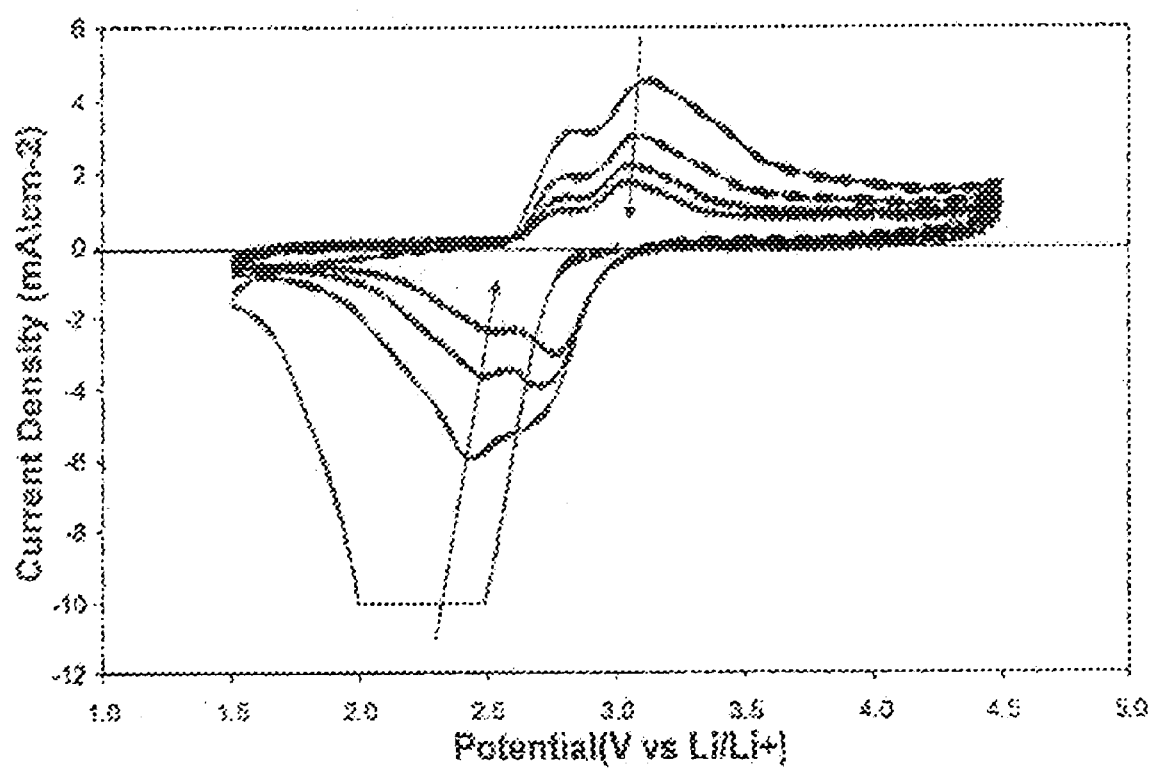
FIG. 3a provides a typical cyclic voltammetry of a favorite polymeric cathode material of the background art—DMcT, cycled in $PC/LiClO_4$.
Figure 3B:
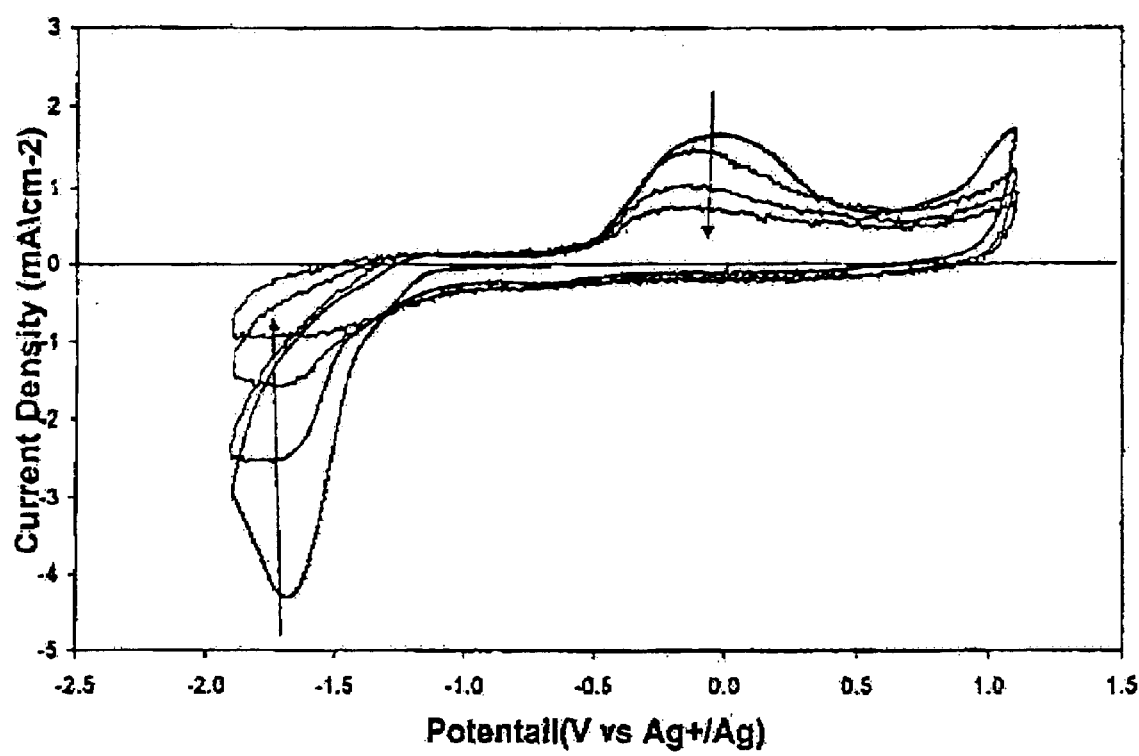
FIG. 3b provides a typical cyclic voltammetry of another preferred polymeric material of the background art—poly (trithiocyanuric acid), cycled in an electrolyte consisting of $Mg(ClO_4)_2$ in PC.

In FIGS. 3a and 3b are presented typical cyclic voltammetries for commonly used polydisulfides in liquid electrolytes. The curves clearly indicate a rapid degradation of the electrochemical properties of the polymers, and of the charge capacity in particular. This is most probably due to diffusion and migration of the monomer species from the electrode.

Typical cyclic voltammetries for two of the more popular polydisulfides of the background art are given herein: FIG. 3a provides a typical cyclic voltammetry for the most common polymeric cathode material of the background art—DMcT—cycled in an electrolyte consisting of $PC/LiClO_4$ (0.5M). It is readily observed that after only four charge-discharge cycles in the solution, most of the polymer has become inactive. After about 10 cycles, the charge capacity dropped to practically zero.

FIG. 3b provides a typical cyclic voltammetry for poly (trithiocyanuric acid) cycled in an electrolyte consisting of $PC/Mg(ClO_4)_2$ (0.5M). Here, also, the rapid deterioration of the cathode performance is evident, with the charge capacity dropping significantly after only four cycles. After about 15 cycles, the charge capacity dropped to practically zero.

The above cyclic voltammograms demonstrate the extremely poor cycling efficiency of DMcT and poly (trithiocyanuric acid) in liquid electrolyte at ambient temperature, in sharp contrast to the superior cycling efficiency displayed by PVM (FIG. 2) over 200 cycles.

EXAMPLE 1

The synthesis of PVM was conducted according to the procedure of Daly, et al. [Polymer Science, Polymer Chemistry Ed., 13, 105 (1975)]. The monomers were polymerized neat at 65° C., with 0.5% to 1.0% (molar) AIBN as an initiator. A cross-linked polymer was synthesized under the same conditions, but with the addition of 0.1–5% (molar) divinylbenzene (DVB) as a crosslinking agent. After pyrolysis of the precursor polymer in NMP at 150° C., the purified PVM was dried under vacuum at room temperature and introduced to an argon-filled glove box for further preparations and electrochemical characterization.

EXAMPLE 2

Electrodes containing PVM were prepared as follows: PVM was dissolved in NMP. The NMP solution of PVM with 8 to 10% carbon black was mixed and spread onto platinum or nickel foil. After evaporation of the solvent the electrodes were tested in half-cells with a variety of solutions as described in the examples below.

EXAMPLE 3

The dry composite electrode was introduced into an electrochemical cell containing sulfolane with 0.5M $LiPF_6$. The half-cell consisted of the PVM working electrode standard lithium wire as the reference electrode and lithium foil as the counter-electrode (auxilary electrode). The working electrode was scanned between 1.5 V to 4.75 V at a scan rate of 5 mV/S for 200 cycles. The specific charge capacity calculated from the data was 31 mAh/g; the cycling efficiency approached 100% (in fact, the specific charge capacity increased from cycle to cycle in the first 10–20 cycles, then stabilized and remained constant throughout the rest of the experiment).

EXAMPLE 4

The dry composite electrode was introduced into an electrochemical cell containing propylene carbonate with 0.25M $Mg(ClO_4)_2$. The half-cell consisted of the PVM working electrode, standard $Ag/Ag^+$silver reference electrode and a mercury pool as the counter-electrode. The working electrode was scanned between −1.5 V to 1.25 V vs. the standard $Ag/Ag^+$silver reference electrode at a scan rate of 1 mV/S for 20 cycles. The specific charge capacity calculated from the data was 44 mAh/g; the cycling efficiency was 90%.

EXAMPLE 5

The dry composite electrode was introduced into an electrochemical cell containing propylene carbonate with 1M $LiBF_4$. The half-cell consisted of the PVM working electrode, standard lithium wire as the reference electrode and lithium foil as the counter-electrode. The working electrode was scanned between 1.5 V to 4.75 V at a scan rate of 1 mV/S for 200 cycles. The specific charge capacity calculated from the data was 77 mAh/g; the cycling efficiency was substantially 100% over 200 cycles.

It will be appreciated that the above descriptions are intended only to serve as examples, and that many other embodiments are possible within the spirit and the scope of the present invention.

What is claimed is:

1. An electrochemical device comprising:
   (a) a cathode for a battery, said cathode including polyvinyl mercaptan (PVM).

2. The electrochemical device of claim 1, wherein said cathode further comprises a conducting additive.

3. The electrochemical device of claim 2, wherein said conducting additive is selected from the group consisting of carbon black, graphite powder, acetylene black, high surface area carbon, and combinations thereof.

4. The electrochemical device of claim 1, wherein said cathode is substantially free of binder.

5. An electrochemical cell comprising a cathode material comprising polyvinyl mercaptan (PVM), an anode material, and a liquid electrolyte.

6. The electrochemical cell of claim 5, wherein said anode material comprises a material selected from the group consisting of lithium, sodium, magnesium, magnesium salts, aluminum, lithiated carbon, and lithiated tin oxide.

7. The electrochemical cell of claim 5, wherein said electrolyte comprises a solvent selected from the group consisting of acetonitrile, sulfolane, alkyl carbonates, propylene carbonate, ethylene carbonate, esters, methyl formate, organic solvents, glyme, diglyme, NMP, and combinations thereof.

8. The electrochemical cell of claim 5, wherein said electrolyte comprises a cation selected from the group consisting of lithium, sodium, potassium, magnesium, aluminum, tetraalkylammonium, and combinations thereof.

9. The electrochemical cell of claim 5, wherein said electrolyte comprises an anion selected from the group consisting of $PF_6$, $AsF_6$, $ClO_4$, $BF_4$, F, and combinations thereof.

10. The electrochemical cell of claim 5, wherein said electrolyte comprises a salt selected from the group consisting of tetraalkyl ammonium tetrafluoroborate, $LiPF_6$, $LiBF_4$, $Mg(ClO_4)_2$ and combinations thereof.

11. The electrochemical cell of claim 5, wherein said electrochemical cell is substantially rechargeable at ambient temperatures.

12. The electrochemical cell of claim 5, wherein said cathode further comprises a conducting additive.

13. The electrochemical cell of claim 12, wherein said conducting additive is selected from the group consisting of carbon black, graphite powder, acetylene black, high surface area carbon, and combinations thereof.

14. The electrochemical cell of claim 5, wherein said cathode is substantially free of binder.

15. The electrochemical device of claim 1, wherein said electrochemical device is substantially rechargeable at ambient temperatures.

16. An electrochemical cell comprising:
   (a) a cathode including PVM;
   (b) an anode, and
   (c) an electrolyte.

17. The electrochemical cell of claim 16, wherein said electrolyte is a liquid electrolyte.

18. The electrochemical cell of claim 16, wherein said cathode further includes a conducting additive selected from the group consisting of carbon black, graphite powder, acetylene black, high surface area carbon, and combinations thereof.

19. The electrochemical cell of claim 16, wherein said anode includes a material selected from the group consisting of lithium, sodium, magnesium, magnesium salts, aluminum, lithiated carbon, and lithiated tin oxide.

20. The electrochemical cell of claim 17, wherein said liquid electrolyte includes an anion selected from the group consisting of $PF_6$, $AsF_6$, $ClO_4$, $BF_4$, F, and combinations thereof.

* * * * *